United States Patent
Jablonski

(10) Patent No.: US 12,296,879 B2
(45) Date of Patent: May 13, 2025

(54) MILITARY GRADE TELESCOPING BACKPACK EXTRACTION CART

(71) Applicant: John Jablonski, Brookfield, OH (US)

(72) Inventor: John Jablonski, Brookfield, OH (US)

(*) Notice: Subject to any disclaimer, the term of this patent is extended or adjusted under 35 U.S.C. 154(b) by 333 days.

(21) Appl. No.: 18/068,001

(22) Filed: Dec. 19, 2022

(65) Prior Publication Data

US 2023/0202544 A1 Jun. 29, 2023

Related U.S. Application Data

(60) Provisional application No. 63/293,907, filed on Dec. 27, 2021.

(51) Int. Cl.
 *B62B 1/12* (2006.01)
 *B62B 5/00* (2006.01)

(52) U.S. Cl.
 CPC ............ *B62B 1/125* (2013.01); *B62B 5/0023* (2013.01)

(58) Field of Classification Search
 CPC .............................. B62B 1/125; B62B 5/0023
 See application file for complete search history.

(56) References Cited

U.S. PATENT DOCUMENTS

| | | | |
|---|---|---|---|
| 2,602,675 A * | 7/1952 | Forman | B62B 1/125 280/655 |
| 2,929,608 A | 3/1960 | Zippel | |
| 5,564,720 A * | 10/1996 | Stringer | B62B 5/0023 280/654 |
| 6,092,817 A * | 7/2000 | Kilmer | B62B 1/125 280/654 |
| 6,217,043 B1 | 4/2001 | Chumley | |
| 6,783,147 B1 * | 8/2004 | Green, Sr. | B62B 1/20 D34/12 |
| 7,175,188 B2 * | 2/2007 | Joncourt | A45F 3/14 280/47.17 |
| 7,210,697 B2 * | 5/2007 | Simpson | B62B 5/06 16/446 |
| 9,415,786 B1 * | 8/2016 | Lorrigan | B62B 1/206 |
| 9,573,639 B1 * | 2/2017 | Furtado | B62D 63/061 |
| 2007/0235255 A1 | 10/2007 | Wallace et al. | |
| 2017/0135332 A1 | 5/2017 | Doyle | |

* cited by examiner

*Primary Examiner* — Bryan A Evans
(74) *Attorney, Agent, or Firm* — Harpman & Harpman

(57) ABSTRACT

A self-contained portable material transport cart for game transport and utility transport of equipment and supplies including emergency medical transport in multiple venues. The extraction cart has a lightweight collapsible frame with cargo support straps or netting. Fixed and folding wheels and telescopically extensible frame members allow for compact storage and backpack transport to user location. Extensible frame is adjustable for length and width for cargo transport with an optional trailer hitch adapter allowing the cart to be pulled by an off-road vehicle, if needed.

7 Claims, 9 Drawing Sheets

MILITARY GRADE TELESCOPING BACKPACK EXTRACTION CART

This application claims the benefit of U.S. Provisional Application No. 63/293,907, filed on Dec. 27, 2021.

BACKGROUND OF THE INVENTION

1. Technical Field

This invention relates to portable wheeled carts and the like that function as cargo sleds to transport loads over uneven and difficult terrain.

2. Description of Prior Art

Prior art devices of this type have been developed for wheeled transport, see for example U.S. Pat. Nos. 2,629,608, 6,217,043 and U.S. Publications 2004/0130112, 2017/0135332 and 2007/025255.

In U.S. Pat. No. 2,629,608 an animal carrying cart is disclosed having a V-shaped frame with a single end wheel in oppositely disposed wide frame extending handle portions for engagement.

U.S. Pat. No. 6,217,043 claims a portable cart and method having a compact tubular frame construction with a pair of wheels and a material netting in a rectangular configuration.

U.S. Publication 2004/013112 is a one-wheeled collapsible deer drag with a fixed V-shaped tubular frame with user engagement straps extending therefrom.

U.S. Publication 2017/0135332 illustrates a collapsible one-wheeled game cart with carrying straps.

Finally, in U.S. Publication 2007/025255 a combination hunting stand and cart is disclosed having a ladder frame defining a hunting station and a one-wheeled cart to transport game from the woods.

SUMMARY OF THE INVENTION

A portable collapsible two wheeled transport cart with tubular telescoping lightweight frame elements that provide both longitudinal and transverse adjustment extensions. A pair of fixed and folding wheels for ground engagement or folded for cart transport. Cross and elongated netting is provided for game and material transport providing a multiple use universal wheeled cart for a variety of uses. The cart can be collapsed and carried on a backpack configuration and may have interchangeable wheels size for varied terrain accessibility. An optional travel hitch is provided for powered towed transport.

DETAILED DESCRIPTION OF THE INVENTION

Figure 1:
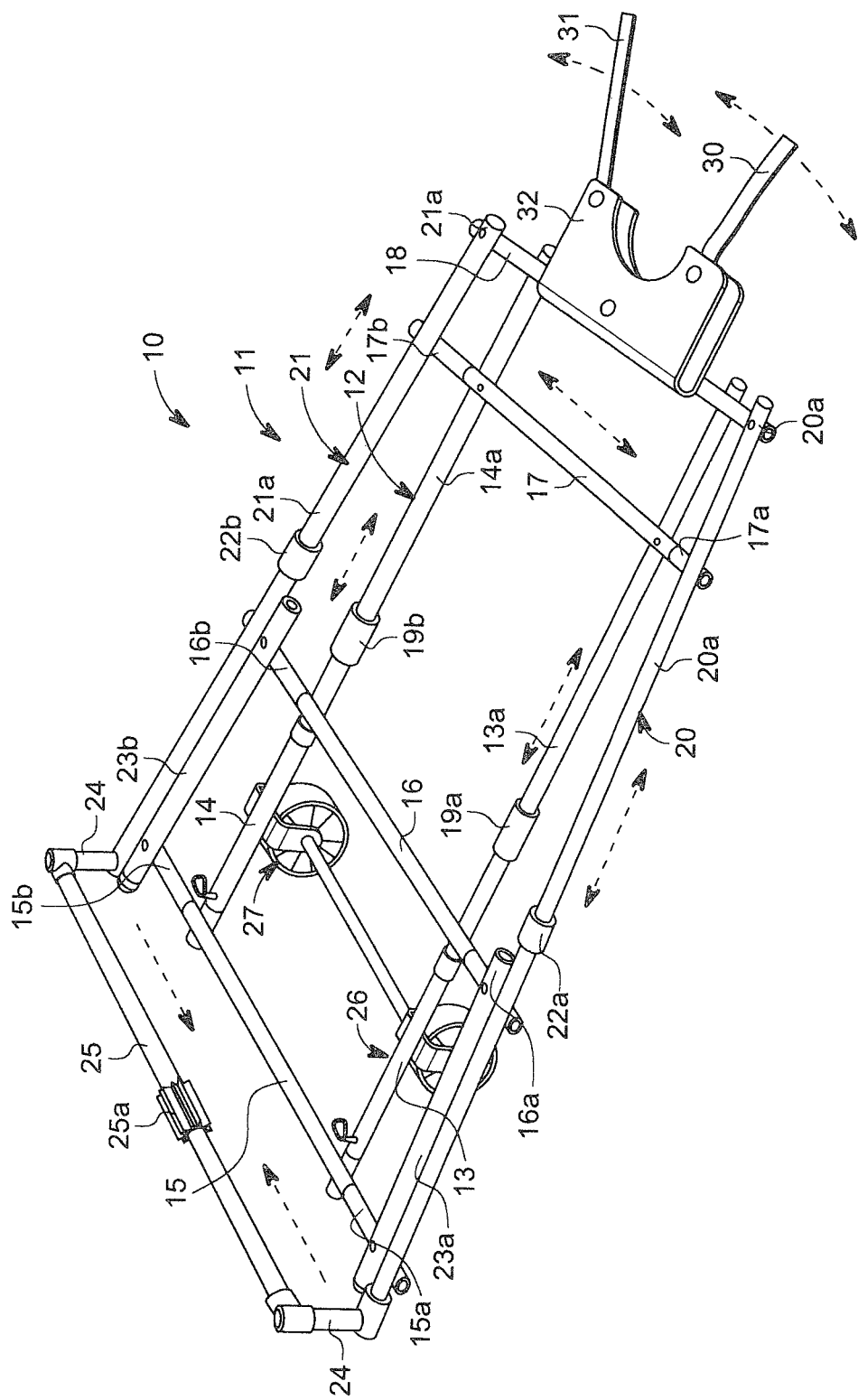
FIG. 1 is a perspective view of the transport sled of the invention in open use position.
Figure 2:
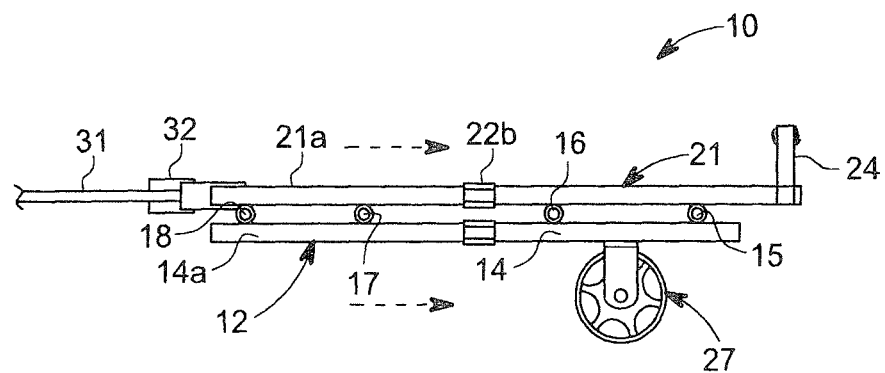
FIG. 2 is a side elevational view thereof.
Figure 3:
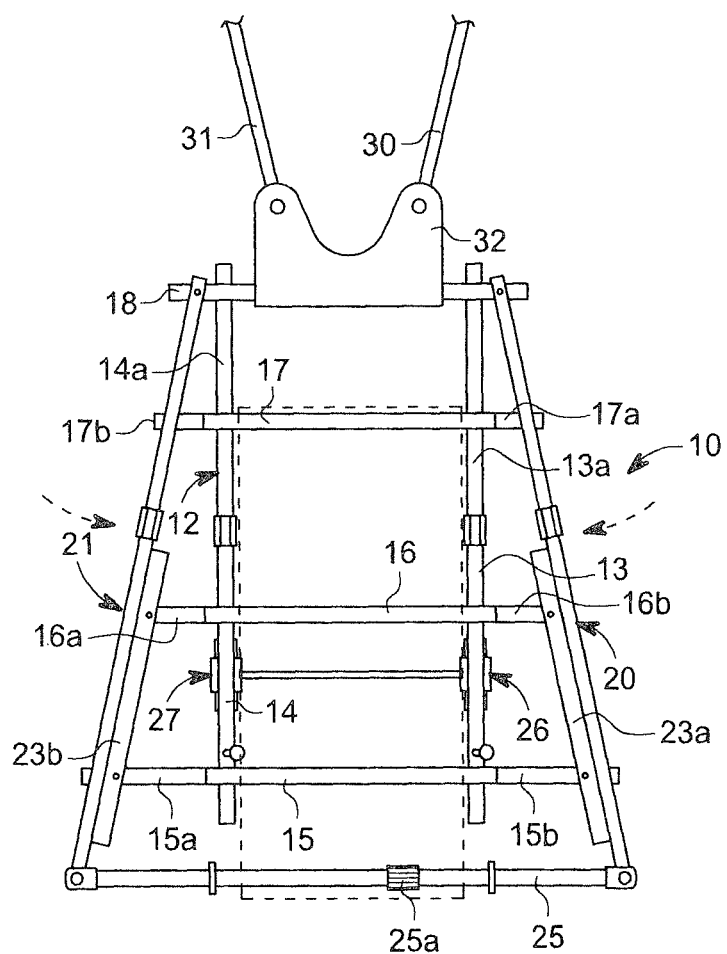
FIG. 3 is a top plan view of the transport sled.
Figure 4:
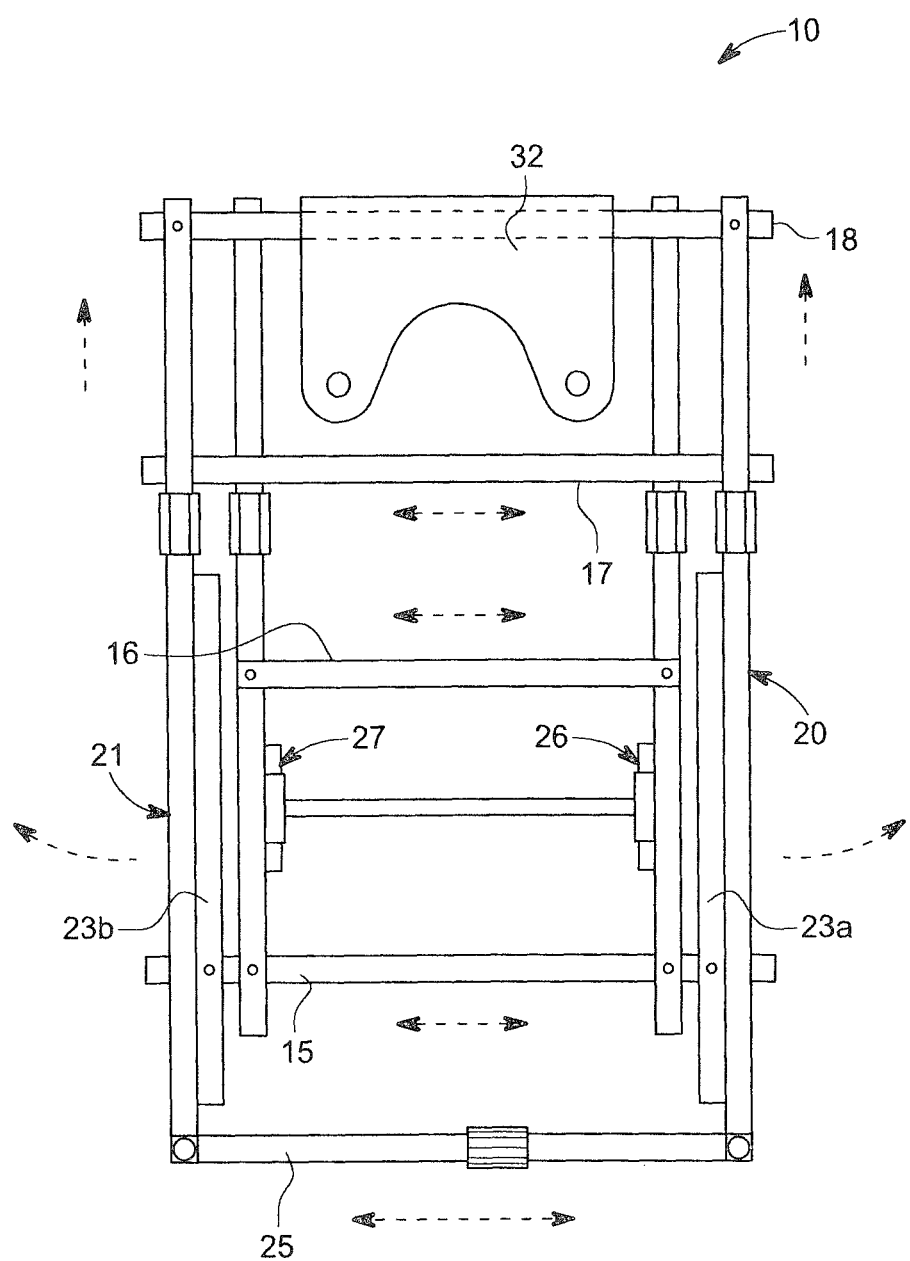
FIG. 4 is a top plan view of the transport cart in collapsed transport position.

Referring now to FIGS. 1-3 of the drawings a wheeled transport cart 10 of the invention can be seen having a tubular frame 11 with a primary rectangular support portion 12. A pair of spaced parallel rails 13 and 14 are secured together by spaced parallel transverse elements 15, 16 and 17 with a front cross member 18. The rails 13 and 14 have adjustable telescopically extensible portions 13A and 14A with respective frame member extension locks 19A and 19B. The transverse connection frame elements 15, 16 and 17 each have adjustable extensible telescopic end portions 15A, 15B, 16A, 16B and 17A and 17B which are pivotally secured at right angles to a secondary pair of spaced tubular rails 20 and 21. The secondary rails 20 and 21 in spaced parallel relation to the primary rails 13 and 14 each have a telescopically extensible portions 20A and 21A with corresponding adjustable tubular frame locks 22A and 22B which allow for locking frictional engagement of the respective telescopically extensible portions. A pair of reinforcement tubular elements 23A and 23B are secured to the secondary rails extending over the corresponding cross members 15 and 16. The respective ends of the secondary rails 20, 20A and 21, 21A are pivotally secured to the hereinbefore described respective front cross end element 15 and oppositely disposed cross element 18.

A pair of upstanding tubular elements 24 and fittings extend from the secondary rails 20 and 21 oppositely disposed ends with a rear cross connection member 25 pivotally secured there between. The rear cross member 25 has a telescopic frame lock 25A for transverse extension. The multiple rail construction forms the compound adjustable transport frame 11 that will be described in use hereinafter.

It will be seen that a pair of fixed wheel assemblies 26 and 27 are positioned on the primary side rails 13 and 14 between the cross-frame elements 15 and 16, each having a rail engagement with depending apertured brackets 29 for wheel and axle assemblies 29A respectively. An alternate folding wheel assembly 40 can be seen in FIGS. 10, and 11 of the drawings. Rail engagement sleeves 41 are secured with a pin P extending through aligned openings in their respective side rail 13 and 14 ends. This orientation allows each of the wheel assemblies 40 to be locked in either a ground engagement position or selectively rotated and secured in a transport position shown in broken lines in FIGS. 10 and 11 of the drawings. It will be noted that interchangeable, wide wheels (not shown) can used for sand transport.

Figure 6:
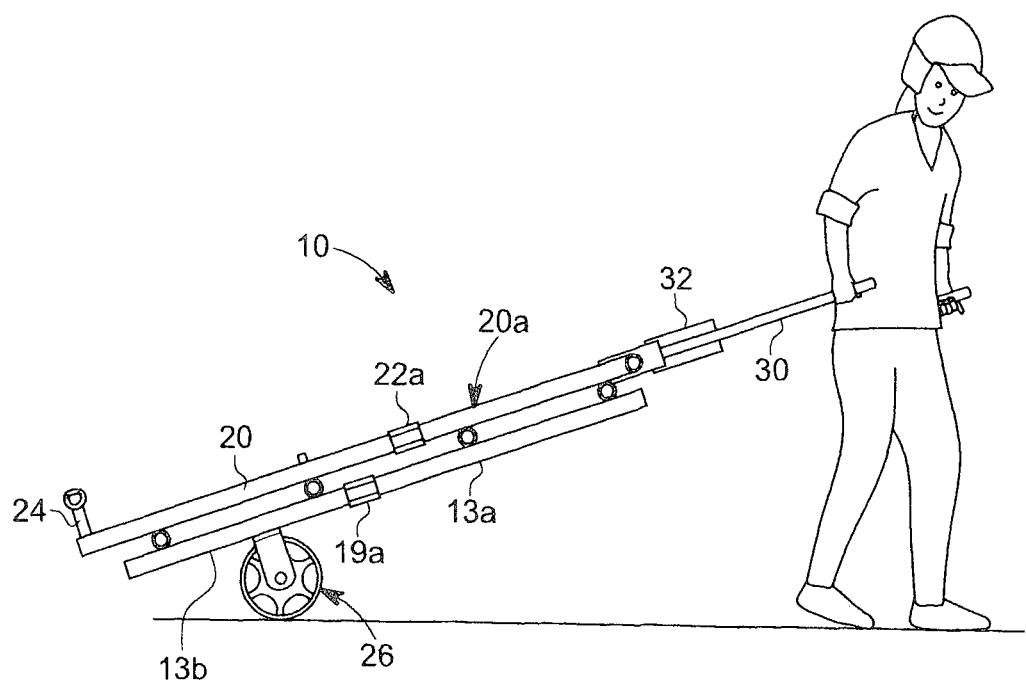
FIG. 6 is a side elevational view of the transport cart shown in use with a person.

The compound adjustable transport frame 11 will therefore provide an expandable triangular support structure as seen being deployed in FIGS. 1, 2 and 3 of the drawings tapering from the extended rear cross frame member 25 to the front-end cross element 18. A pair of user engagement handle extensions 30 and 31 are rotatably secured within a mounting housing 32 positioned over the cross element 18 to provide adjustability orientation of the handles 30 and 31 so as to accommodate a wide variety of users U as best seen in FIG. 6 of the drawings, thereby allowing the user U to grip and pull the transport cart 10 along behind him as is well known within the art.

It will be seen that a flexible mesh net transport support panel fitting 33 is selectively secured to the respective rail and cross frame members to provide cross support for materials M or game engagement on the cart or human extraction, not shown.

Figure 7:
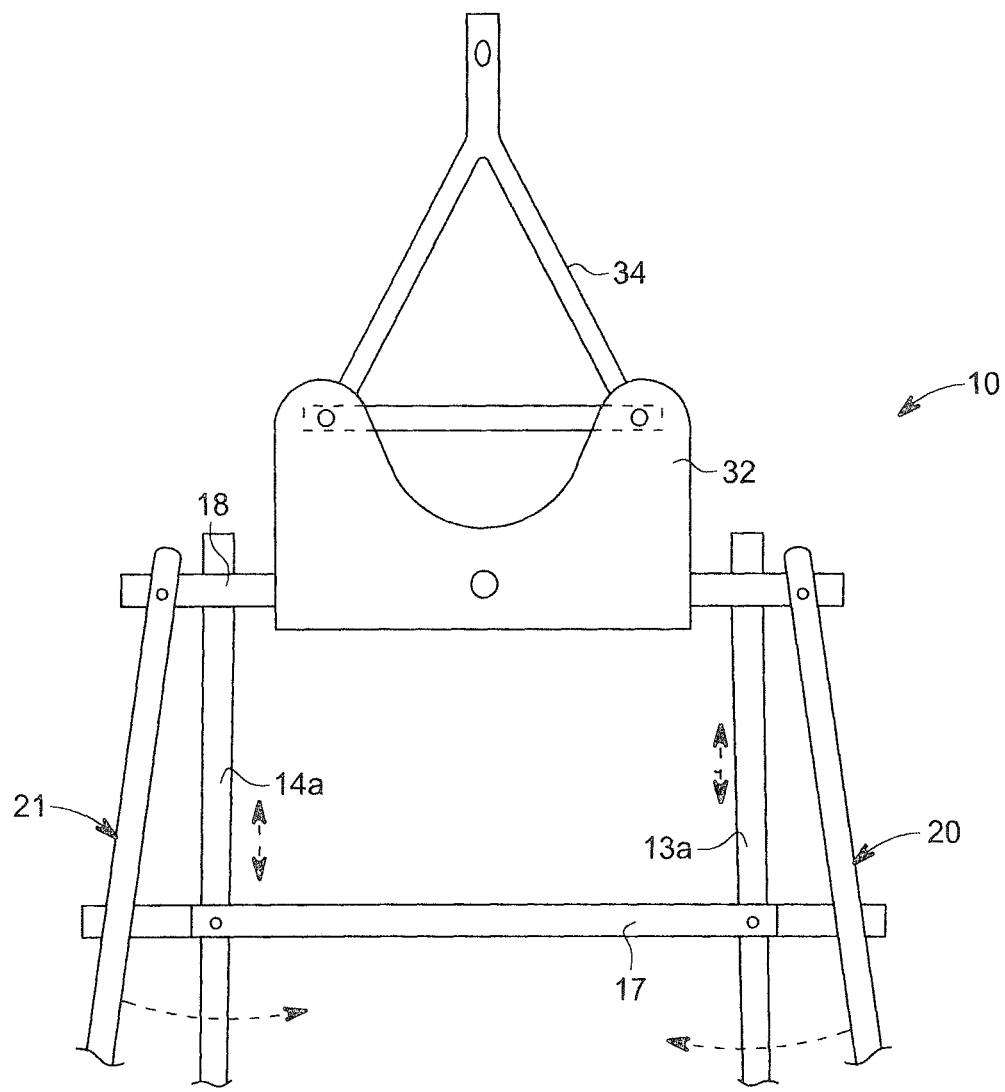
FIG. 7 is an enlarged partial top plan view of the trailer hitch option for the transport cart.
Figure 8:
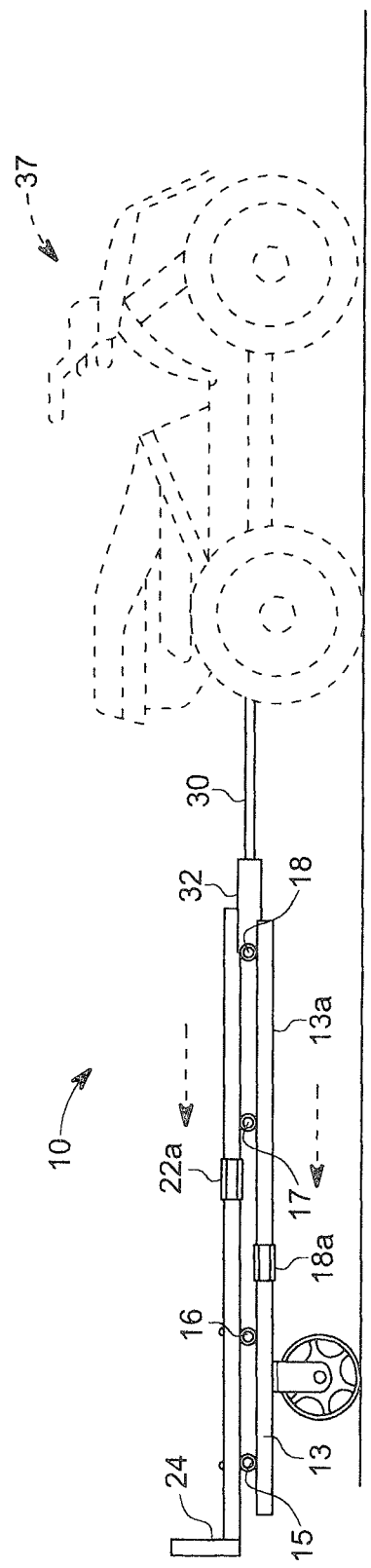
FIG. 8 is a side elevational view of the transport sled of the invention with trailer hitch and an ATV shown in broken lines.
Figure 9:
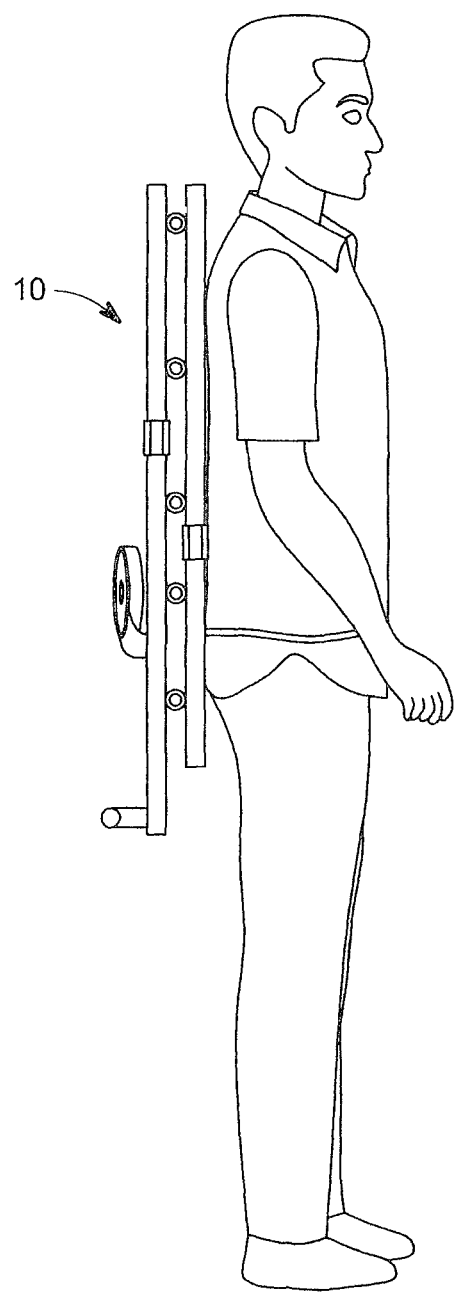
FIG. 9 is a perspective view of the transport sled in collapsed transport position as a backpack configuration on a user.

Referring now to FIGS. 7 and 8 of the drawings, a tubular trailer hitch fitting 34 can be seen selectively secured within the end frame engagement mounting bracket 32. The bracket 32 is positioned on the front-end cross member 17 with mounting apertures.

Figure 5:
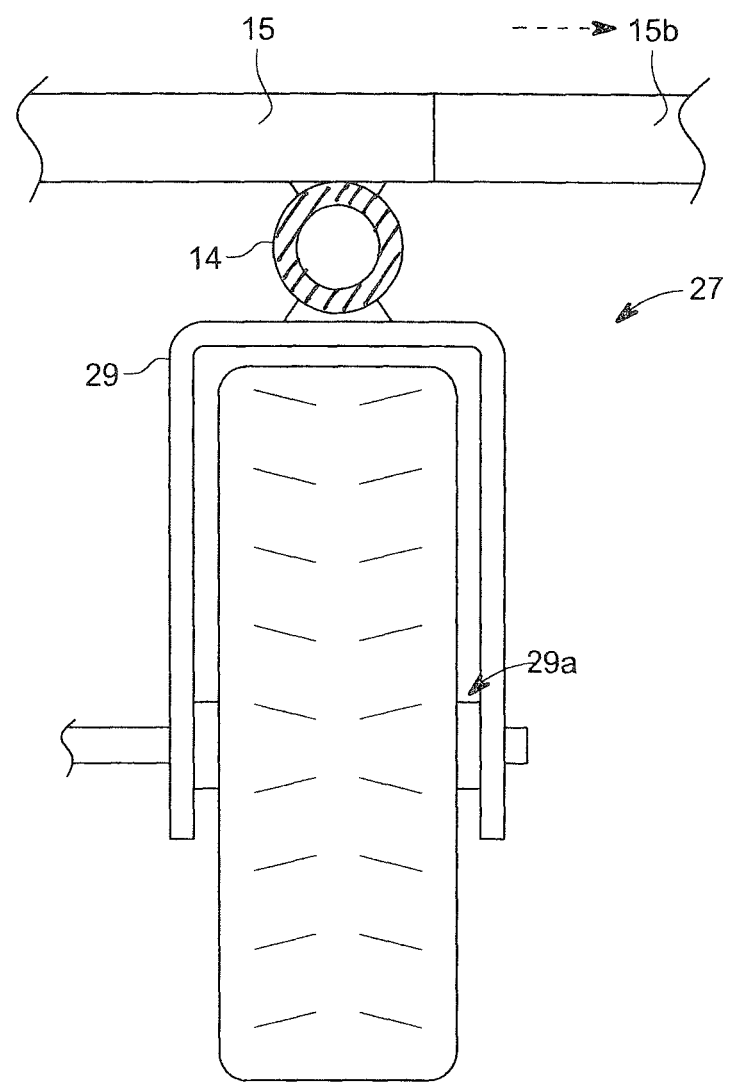
FIG. 5 is an enlarged partial end elevational view of the cart's fixed wheel and
  mounting.
Figure 10:
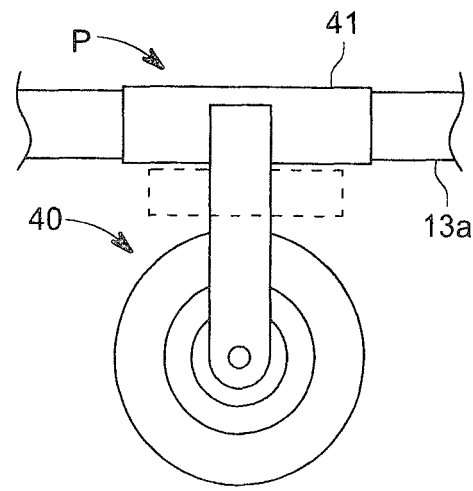
FIG. 10 is a partial side elevational view of an alternate folding support wheel assembly in solid lines and in folded position in broken lines.
Figure 11:
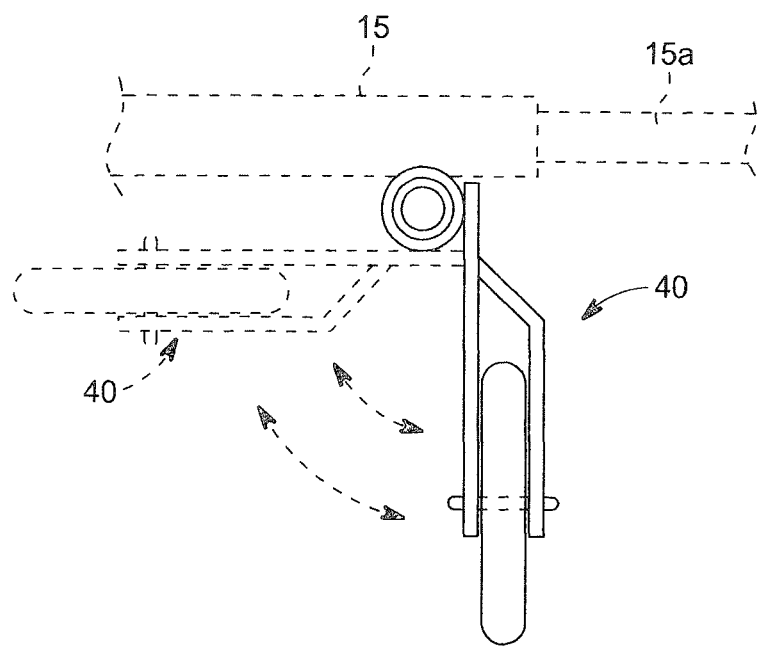
FIG. 11 is a partial front sectional view thereof with wheel assembly in folded position in broken lines.

The apertured trailer hitch fitting 34 will allow the transport cart 10 to be towed by a powered vehicle such as an off-road ATV 37 shown in broken lines in FIG. 10 of the drawings. It will be evident from the above description that the new and novel transport cart 10 will provide a self-contained universal transport capable of being adjustably collapsed into itself into a compact easily transportable configuration as illustrated in FIG. 5 of the drawings by telescopically adjustable rails 13 and 14 and 20 and 21 with transversely adjustable of the multiple frame elements 15, 16, and 17 and rear cross member 25. The size and the lightweight military grade construction, in this example of tubular aluminum elements allows for easy transport that can be carried in a backpack configuration as seen in FIG. 11 of the drawings, for example. As noted, the frame 11 is preferably formed from lightweight tubular aluminum with multiple pivotal engagement points and slidably extensible telescopically interengagement frame elements locked in place by corresponding friction lock fittings. It therefore will be evident to those skilled in the art that various changes and modifications may be made thereto without departing from the spirt of the invention.

Therefore I claim:

1. A collapsible portable transport cart used in hunting and material transport comprising, pairs of longitudinally extending tubular frame rails, multiple transversely connecting frame elements pivotally secured in spaced longitudinal relation to said frame rails, said frame rails and said connecting frame elements are each telescopically extensible from a first collapsed transport position to an extended open use position, wheel assemblies attach respectively to one pair of longitudinal frame rails, an upstanding telescopically extensible rear cross connecting member in offset parallel spaced relation to one of said connecting frame elements, tubular frame locks on respective frame rails, and upstanding rear cross member, a mounting housing extending from a front cross member and a pair of handle extensions pivotally extending from said mounting housing.

2. The collapsible portable transport cart set forth in claim 1 wherein said pairs of longitudinally extending tubular frame members are in vertical spaced relation to one another with said transversely extensible respective connecting frame elements extending there between.

3. The collapsible portable transport cart set forth in claim 1 wherein one pair of said longitudinally extending tubular frame rails are pivotally secured to said front cross member respective free ends.

4. The collapsible portable transport cart set forth in claim 1 wherein a mesh net material transport panel is secured from said upstanding cross member to one of said connecting frame elements adjacent said front cross member.

5. The collapsible portable transport cart set forth in claim 1 wherein said handle extensions are selectively removable from said mounting housing and a trailer hitch fitting is secured in place thereof.

6. The collapsible portable transport cart set forth in claim 1 further comprises, folding wheel assemblies having, frame engagement sleeves, depending wheels movable from a first ground engagement position to a second folded retracted position against said frame.

7. The collapsible portable transport cart set forth in claim 1 wherein said first collapsed transport position is of a backpack configuration.

* * * * *